US011290362B2

(12) United States Patent
Smith et al.

(10) Patent No.: US 11,290,362 B2
(45) Date of Patent: Mar. 29, 2022

(54) OBTAINING LOCAL AREA NETWORK DIAGNOSTIC TEST RESULTS

(71) Applicant: BRITISH TELECOMMUNICATIONS PUBLIC LIMITED COMPANY, London (GB)

(72) Inventors: Alan Smith, London (GB); Trevor Burbridge, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 49 days.

(21) Appl. No.: 16/647,147

(22) PCT Filed: Sep. 6, 2018

(86) PCT No.: PCT/EP2018/074063
§ 371 (c)(1),
(2) Date: Mar. 13, 2020

(87) PCT Pub. No.: WO2019/052897
PCT Pub. Date: Mar. 21, 2019

(65) Prior Publication Data
US 2020/0304397 A1 Sep. 24, 2020

(30) Foreign Application Priority Data
Sep. 13, 2017 (EP) .................................. 17190969

(51) Int. Cl.
*H04L 12/26* (2006.01)
*H04L 43/50* (2022.01)
(Continued)

(52) U.S. Cl.
CPC ............ *H04L 43/50* (2013.01); *H04L 43/026* (2013.01); *H04L 43/0817* (2013.01); *H04L 43/0882* (2013.01)

(58) Field of Classification Search
CPC ... H04L 43/50; H04L 43/026; H04L 43/0817; H04L 43/0882
(Continued)

(56) References Cited

U.S. PATENT DOCUMENTS 6,801,756 B1   10/2004  Agrawal et al.
2006/0268731 A1   11/2006  Moore
(Continued)

FOREIGN PATENT DOCUMENTS

WO     2013/023690        2/2013
WO     WO-2013023690 A1 *  2/2013  ............. H04L 47/19
(Continued)

OTHER PUBLICATIONS

Extended Search Report for EP17190969.0 dated Feb. 7, 2018, 7 pages.
(Continued)

*Primary Examiner* — James E Springer
*Assistant Examiner* — Patrick F Ngankam
(74) *Attorney, Agent, or Firm* — Nixon & Vanderhye P.C.

(57) ABSTRACT

Diagnostic test results are obtained in respect of local area networks (LANs), the LANs having user-devices located therein having interfaces and being operable to communicate via those interfaces and via a LAN gateway device with remote devices in a communications network outside their respective LANs. A method comprises comparing performance measures obtained in respect of communication flows with a performance threshold whereby to identify communication flows whose performance measures are indicative of performance below a predetermined level, and for any such communication flows, obtaining a diagnosis in respect of the LAN in question in dependence on a comparison of the performance measure obtained in respect of the identified communication flow and performance measures
(Continued)

obtained in respect of other communication flows, the diagnosis being obtained in dependence on respective portability levels and network interface types determined in respect of the user-devices involved in said communication flows.

20 Claims, 5 Drawing Sheets

(51) Int. Cl.
    *H04L 43/026*     (2022.01)
    *H04L 43/0817*     (2022.01)
    *H04L 43/0882*     (2022.01)

(58) Field of Classification Search
    USPC ............................................ 709/224
    See application file for complete search history.

(56) References Cited

U.S. PATENT DOCUMENTS

| | | | |
|---|---|---|---|
| 2007/0066297 A1 | 3/2007 | Heidari-Bateni | |
| 2008/0049630 A1* | 2/2008 | Kozisek | H04L 41/0823 370/250 |
| 2008/0052394 A1* | 2/2008 | Bugenhagen | H04L 45/22 709/224 |
| 2009/0122711 A1 | 5/2009 | Soomro et al. | |
| 2009/0252148 A1* | 10/2009 | Dolganow | H04L 67/2819 370/351 |
| 2013/0297965 A1 | 11/2013 | Mensah | |
| 2016/0094423 A1* | 3/2016 | Parthasarathy | H04L 61/6018 709/224 |
| 2017/0118091 A1* | 4/2017 | Town | H04L 43/065 |
| 2017/0324627 A1* | 11/2017 | Eardley | H04L 41/0893 |

FOREIGN PATENT DOCUMENTS

| | | | |
|---|---|---|---|
| WO | 2014/155035 | 10/2014 | |
| WO | 2016/147148 | 9/2016 | |
| WO | WO-2016147148 A1 * | 9/2016 | ........... H04L 43/026 |

OTHER PUBLICATIONS

Search Report for GB Application No. 1714747.1 dated Feb. 6, 2018, 5 pages.

International Search Report and Written Opinion of the ISA for PCT/EP2018/074063 dated Nov. 12, 2018, 10 pages.

\* cited by examiner

Figure 3 – Step s210 ("Classify device by network interface used") decomposed

Figure 4 – Step s255 ("Classify Problem") decomposed

OBTAINING LOCAL AREA NETWORK DIAGNOSTIC TEST RESULTS

TECHNICAL FIELD

The present invention relates to methods and apparatus for obtaining diagnostic test results in respect of local area networks.

BACKGROUND

How customers rate the service they receive from their various internet-connected computing and telephony devices is to a large extent dependent on the Quality of Experience they perceive for internet delivered services. The Quality of Experience perceived will depend on the Quality of Service (QoS) that can be achieved end-to-end (e.g. from a content origin server or a remote device to the device in the home). In turn the QoS achieved will depend on a number of network Key Performance Indicators (Network KPIs). Examples of network KPIs include loss, delay, jitter and throughput.

Wireless access is becoming the predominant means for devices to communicate within home and public networks like WiFi hotspots. The inherent variability in the Quality of Service (QoS) achieved by the fixed line network termination equipment and the various wireless devices drives many complaints to Internet Service Providers (ISPs). The QoS of the final network segment has a significant effect on the Quality of Experience (QoE). For ISPs the performance of the home network is a particular problem because it is largely invisible to it and is the ultimate cause of a large number of calls to ISP helplines. There exist different tools for end-users to test the performance of their network. There are also ways for ISPs to monitor performance to the home such as by using Deep Packet Inspection (DPI) or by placing probes in the home such as those by "Sam Knows". Current DPI methods allow monitoring of different devices in the home network but do not allow diagnoses of performance of the wireless network within the home network.

Providing a means to monitor network characteristics within the home network will both highlight when a customer problem is due to a home network issue and also provide information to end-users to inform them of potential problems and also differentiate between problems in their home environment (or WiFi hotspot, etc.) and the broadband network. It will also allow monitoring of wired devices.

Three technical areas are of particular relevance to this mechanism:
Quality of Experience (QoE): A critical driver for home network monitoring solutions is QoE. The correlation between QoE scores and network KPIs has been done by asking test participants to use Internet applications (such as video streaming, web browsing, Voice over Internet Protocol) a number of times, each with different network characteristics. The participant is asked to rate the QoE on a scale of 1-5, for example. The results from a number of participants are combined to give an average QoE score for different inputs of network KPIs.
WiFi: One of the major causes of poor QoE in the home is the variability of WiFi in being able to deliver packets from the access point to each device.
Deep Packet Inspection (DPI): DPI is the inspection of packet headers and packet data as packets pass an inspection point. Techniques for DPI have been used for a long time. Packets are normally captured for inspection by port mirroring or optical splitting so that the analysis does not delay the packets. DPI can be used for security, for example to identify network intrusions. One early use was to identify and limit certain types of traffic such as peer-to-peer file-sharing. Later techniques added the ability to calculate the performance of these flows of data by, for example, looking at the inter-arrival times of packets and working out the bandwidth used by each flow.

WiFi networks are inherently more "lossy" than wired networks. Packets can become corrupted as they are transmitted on the air interface. There are techniques for correcting a small amount of corruption. Typically this is done by providing redundant data in the packets. Where the redundant information is insufficient to recreate the packet data then that packet is effectively lost. The losses are corrected by re-transmission between the WiFi device and the access point/home router. This re-transmission is performed at the layer 2 protocol and is not visible within layer 3 or above (TCP/IP). Packet corruption may be caused by electromagnetic interference within the home environment, for example.

Corruption/Loss can affect network KPIs in many ways:
Re-transmission due to corruption/loss may cause/increase delay. Higher delay reduces the throughput of TCP which in turn means that the user may perceive a drop in performance. TCP throughput decreases with increased delay due to the control algorithm used. Infrequent dropping of packets will not cause the overall, long-term end-to end delay to increase significantly, but the more frequently losses occur, the greater the detrimental effect will be on TCP throughput and hence QoE.
Re-transmission due to corruption/loss may increase jitter. Jitter is the variability in delay. Increasing jitter can affect some internet applications. One of the severest effects will be on live TV streaming. Jitter will be more severe where a packet has to be re-transmitted several times before it is received.
Re-transmission due to corruption/loss may reduce throughput. As well as the effect of delay potentially reducing TCP throughput, access point behaviour will also have an effect. As well as re-transmitting the lost packets, many access points will reduce the sending rate. Essentially the higher the sending rate then the greater the probability of loss. So in a lossy environment throughput is reduced to compensate for this.
Loss may be permanent. This can still happen in WiFi networks where re-transmission has not been successful. Loss can lead to poor QoE. For UDP applications, loss will involve loss of part of the information being transmitted, e.g. loss of some part of a video frame so that increasing "blockiness" is observed by the user. In TCP applications it can lead to a reduction in throughput due to the way the TCP congestion avoidance algorithm works.

Referring now to prior patent documents, International application WO2014/155035 (from the present applicant) relates to techniques for monitoring network performance in respect of a digital communications network comprising a user-network having at least one user-device therein that is able to submit requests for data to and receive data from one or more remote servers via an intermediate control module, and an access network via which data may be delivered to the user-network via the control module. In particular, it aims to allow a network service provider providing network services via an access network to its customers' home networks to have visibility on the performance of its customers' home networks and/or on the performance of one or more networked devices within those customers' home networks by breaking communications into two parts, allowing network performance metrics to be obtained in respect of the transfer of data between the control module and a remote test-server and in respect of the transfer of data between the control module and the user-device. Network performance diagnosis is done based on the two network performance metrics.

United States application US2009/0122711 (Soomro) relates to techniques for measuring delay for QoS monitoring in WLAN 802.11 networks. In particular, it discloses a wireless network including wireless stations (QSTAs) and an access point (QAP). The QAP and/or one or more of the QSTAs measure delay data and/or queue data per traffic type. A network parameter of the QSTA or QAP is adjusted based on the measured delay data and/or queue length. Such techniques require deployment on at least one wireless device in the network.

International application WO2013/023690 (Ericsson) relates to a method carried out by a network node in a communication network, the method including determining from received packets at least one characteristic of one or more end user devices connected through an end-user communication terminal to the communication network. The determining procedure includes inspecting at least one of layer "n" control information of the received packets ("n" being an integer equal to or larger than 3) and the received packets' payload encapsulated by layer 7 control information, the layer levels being understood in the sense of the OSI reference model.

United States application US2013/297965 ("Mensah") (from the present applicant) relates to a diagnostic processor installed in a router on the user side of a network termination. The processor can be downloaded from the network and can in turn be downloaded to user terminals in a local network. On detection of a fault, the processor retrieves data from a store of fault rectification instructions, for display in a form appropriate to a user terminal, giving a user instructions appropriate to the fault condition detected and the type of router being used, allowing the user to rectify the problem without recourse to online or telephone helplines which may be unavailable due to the prevailing fault condition.

United States application US2017/118091 ("Townend") (from the present applicant) relates to methods and systems for detecting performance issues such as contention and interference in a home data network. In a system formed of user devices and a home access point routing device connected to an Internet Service Provider, the home access point is arranged to monitor IP Flow information for data sessions between user devices and remote servers over a wireless or powerline Ethernet home network. Performance issues are determined by the home access point or by a management server.

International application WO2016/147148 ("Ericsson/ Kabada") relates to techniques for categorising packet flows through a network node such as a proxy or router. Packets of a particular flow arriving at the node are monitored for determining whether there is a specific packet traffic pattern associated with the particular flow. Responsive to the determining, appropriate techniques may be utilised for recognising the specific packet traffic pattern as belonging to a category of packet flow.

United States application US2008/049630 ("Kozisek et al") relates to systems and methods for monitoring and optimising network performance to a wireless device. The system includes a wireless router in communication with the wireless device for transmitting and receiving radio-frequency (RF) signals between the wireless router and the wireless device, the wireless router being configured to determine network performance information of the wireless network and concatenate the network performance information into data packets. The system further comprises a packet network switch in communication with the wireless router for communicating the data packets between the wireless router and the packet network switch; and a network management device in communication with the packet network switch for instructing the packet network switch to route the data packets to the wireless router based on the network performance information to optimise the network performance to the wireless device.

United States application US2006/0268731 ("Moore") relates to methods and apparatus for measuring and evaluating access link performance in IP networks that aim to reduce the amount of required test traffic.

Problems in home or other local area networks represent a significant proportion of calls to service providers' helplines, yet such networks are often not only beyond the control of the service providers but may not even be visible to them. Line data is generally available, and probes have often been deployed in customer premises, but these may give little indication of the actual performance delivered to customers' devices, or from the point of view of the customers themselves. Software can be deployed to user-devices but this generally requires the co-operation of the customers. While prior DPI techniques can give an indication of the QoE from the point of view of users using user-devices within the home, the information obtained may not be sufficient to allow certain types of problems to be identified.

SUMMARY OF THE INVENTION

According to a first aspect of the invention, there is provided a method of obtaining diagnostic test results in respect of one or more local area networks, each local area network having at least one user-device located therein having at least one interface and being operable to communicate via said at least one interface and via a local area network gateway device with one or more remote devices in a communications network outside the local area network, the method comprising:

in respect of each of a plurality of communication flows, each communication flow comprising a flow of data between a user-device in a local area network and a remote device outside the local area network, inspecting data in said respective communication flow whereby to obtain, at a monitoring device outside the local area network:
  a performance measure indicative of the performance of the communication flow between the user-device and the remote device, the performance measure being obtained using a predetermined performance measuring process;
  a device category in respect of the user-device, said device category being selected from a plurality of predetermined device categories in dependence on data in said communication flow; and
  a network interface type indicative of the type of network interface being used by the user-device in respect of the communication flow, the network interface type being selected from a plurality of predetermined network interface types in dependence on data in said communication flow;

in respect of each user-device involved in one or more of said communication flows, determining a portability level of the user-device, the portability level of the user-device being one of a plurality of predetermined user-device portability levels, the portability level of the user-device being determined in dependence on the device category of the user-device;

comparing the performance measures obtained in respect of said communication flows with a performance threshold whereby to identify any communication flow whose performance measure is indicative of performance below a predetermined level, and in the event of any such communication flow being identified, obtaining a diagnosis in respect of the local area network in which the user-device is located in dependence on a comparison of the performance measure obtained in respect of said identified communication flow and one or more performance measures obtained in respect of other communication flows, the diagnosis being obtained in dependence on the respective portability levels and network interface types determined in respect of the user-devices involved in said communication flows.

It will be apparent that the portability level for a device is an indication (numerical or otherwise) of how portable the device (or a device of the category in question) is deemed to be.

According to preferred embodiments, the plurality of communication flows may comprises flows of data between one or more user-devices in the same local area network and one or more remote devices outside said local area network. Alternatively or additionally, the plurality of communication flows may comprise flows of data between respective user-devices in different local area networks and one or more remote devices outside the local area network of the respective user-device.

According to preferred embodiments, the inspection of data in said communication flows may comprise deep packet inspection.

According to preferred embodiments, the measures indicative of the performance of the communication flows may comprise measures in respect of one or more of bandwidth, loss, latency and jitter.

According to preferred embodiments, the device category obtained in respect of the user-device in respect of a communication flow may be determined from information in one or more packet headers of one or more packets of which the communication flow is comprised.

According to preferred embodiments, the network interface type obtained in respect of a communication flow may be determined in dependence on the device category obtained in respect of the user-device in respect of the communication flow. Alternatively or additionally, the network interface type obtained in respect of a communication flow may be determined from analysis of the communication flow. Alternatively or additionally, the network interface type obtained in respect of a communication flow may be determined from information in one or more packet headers of one or more packets of which the communication flow is comprised.

According to preferred embodiments, the diagnosis in respect of a local area network in which is located a user-device involved in a communication flow whose performance measure is indicative of performance below a predetermined level may be obtained in dependence on the performance measure obtained in respect of said communication flow and one or more performance measures obtained in respect of one or more other communication flows involving one or more other user-devices in the same local area network.

Alternatively or additionally, the diagnosis in respect of a local area network in which is located a user-device involved in a communication flow whose performance measure is indicative of performance below a predetermined level may obtained in dependence on the performance measure obtained in respect of said communication flow and one or more performance measures obtained in respect of one or more other communication flows involving one or more other user-devices in one or more other local area networks.

Alternatively or additionally, the diagnosis in respect of a local area network in which is located a user-device involved in a communication flow whose performance measure is indicative of performance below a predetermined level may be obtained in dependence on the performance measure obtained in respect of said communication flow and one or more performance measures obtained in respect of one or more other communication flows involving one or more other user-devices having corresponding portability levels and/or network interface types.

Alternatively or additionally, wherein the diagnosis in respect of a local area network in which is located a user-device involved in a communication flow whose performance measure is indicative of performance below a predetermined level may be obtained in dependence on the performance measure obtained in respect of said communication flow and one or more performance measures obtained in respect of one or more other communication flows involving one or more other user-devices having different portability levels and/or network interface types.

According to a second aspect of the invention, there is provided apparatus for obtaining diagnostic test results in respect of one or more local area networks, each local area network having at least one user-device located therein having at least one interface and being operable to communicate via said at least one interface and via a local area network gateway device with one or more remote devices in a communications network outside the local area network, the apparatus comprising:

one or more processors configured to inspect data in in respect of each of a plurality of communication flows, each communication flow comprising a flow of data between a user-device in a local area network and a remote device outside the local area network whereby to obtain, at a monitoring device outside the local area network:

a performance measure indicative of the performance of the communication flow between the user-device and the remote device, the performance measure being obtained using a predetermined performance measuring process;

a device category in respect of the user-device, said device category being selected from a plurality of predetermined device categories in dependence on data in said communication flow; and a network interface type indicative of the type of network interface being used by the user-device in respect of the communication flow, the network interface type being selected from a plurality of predetermined network interface types in dependence on data in said communication flow;

the one or more processors further being configured to determine, in respect of each user-device involved in one or more of said communication flows, a portability level of the user-device, the portability level of the user-device being one of a plurality of predetermined user-device portability levels, the portability level of the user-device being determined in dependence on the device category of the user-device;

the one or more processors further being configured to compare the performance measures obtained in respect of said communication flows with a performance threshold whereby to identify any communication flow whose performance measure is indicative of performance below a predetermined level, and in the event of any such communication flow being identified, to obtain a diagnosis in respect of the local area network in which the user-device is located in dependence on a comparison of the performance measure obtained in respect of said identified communication flow and one or more performance measures obtained in respect of other communication flows, the diagnosis being obtained in dependence on the respective portability levels and network interface types determined in respect of the user-devices involved in said communication flows.

According to a third aspect of the invention, there is provided a computer program element comprising computer program code to, when loaded into a computer system and executed thereon, cause the computer to perform the steps of a method according to the first aspect.

The various options and preferred embodiments referred to above in relation to the first aspect are also applicable in relation to the second and third aspects.

Preferred embodiments of the invention involve methods and apparatus for obtaining diagnostic test results in respect of local area networks using a monitoring device outside the local area networks in question that inspects data in flows between devices in the local area networks and remote devices (e.g. servers) outside those local area networks (possibly in other local area networks), avoiding the need to place sensors or other monitoring equipment in the local area networks in question or to install software on user-devices or elsewhere in those local area networks. By taking account of the types of network interfaces being used by the user-devices and a measure of the "portability" of each user-device, performance can be compared between different devices in the same local area network and/or between corresponding devices in different local area networks in order to identify/diagnose problems with network performance in respect of the local area networks.

Preferred embodiments of the invention allow a network provider to have visibility on the performance of devices within a user's home, including the wireless network performance of a local area network gateway device providing wireless connectivity to devices within the local area network. As indicated above, such visibility may be provided without software having to be installed on the users' devices.

BRIEF DESCRIPTION OF THE DRAWINGS

A preferred embodiment of the present invention will now be described with reference to the appended drawings, in which.

DESCRIPTION OF PREFERRED EMBODIMENTS OF THE INVENTION

With reference to the accompanying figures, methods, apparatus and systems according to preferred embodiments will be described.

Figure 1:
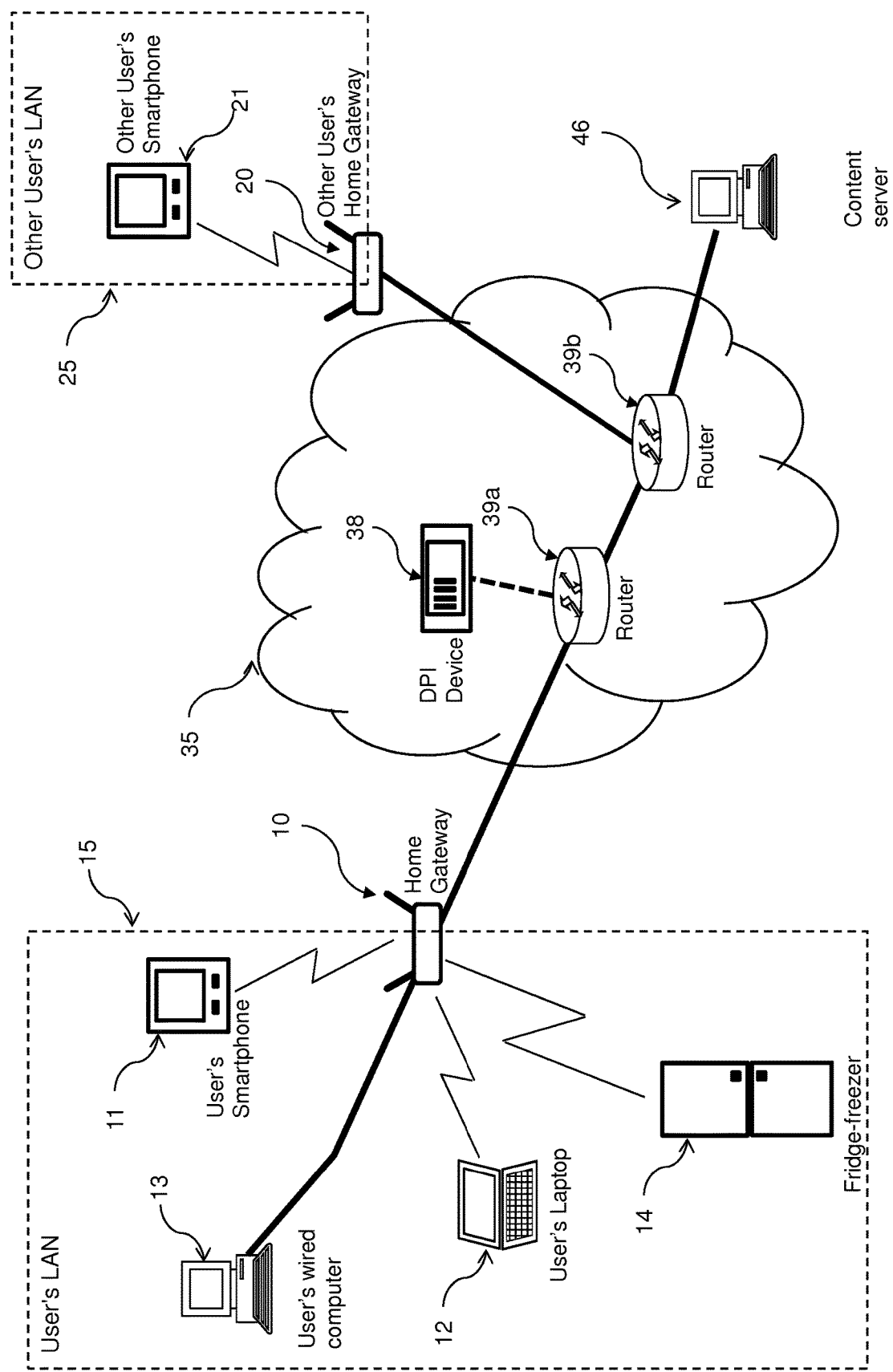
FIG. 1 illustrates various entities which may be involved in performing network performance monitoring and in obtaining diagnostic test results according to a preferred embodiment.

Referring to FIG. 1, this illustrates entities which may be involved in performing network performance monitoring in respect of one or more local area networks (LANs) 15, 25 of remote premises such as homes or small offices from a location within an Internet Service Provider's (ISP) network 35 or within another such "external" network (i.e. a network outside the LAN or LANs in question), and thereby obtaining diagnostic test results in respect of the one or more local area networks according to a preferred embodiment. Briefly, according to this embodiment, Deep Packet Inspection (DPI) may be used to glean details of what devices are being used. Each device may then be classified by its means of communication within the home LAN in question, and in terms of its portability, in order to allow the ISP in question to detect poor wireless network performance and to determine the cause of that poor performance by comparing performance across different times and different devices with reference to their means of communication and their portability.

A great deal of data can be obtained by using DPI within a network. Performance indicators (such as bandwidth, loss, latency and jitter) can be calculated and used to identify problems in an end-to-end path across the network. The application and content details can be gleaned from headers and can be used to estimate QoE scores for a range of Internet applications such as web-browsing, video streaming, etc. The estimated QoE scores can be compared to target QoE scores to determine whether each device and connection technology in the home network is always (i.e. usually or generally) capable of using a range of Internet applications with a target QoE score.

Figure 6:
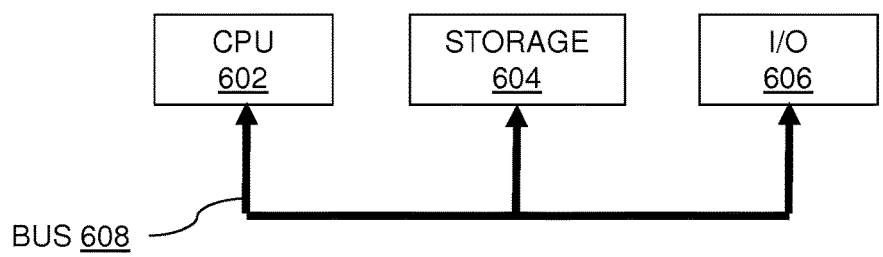
FIG. 6 is a block diagram of a computer system suitable for use in performing methods according to preferred embodiments of the invention.

The method may implemented on a piece of network equipment such as a DPI Device 38 in FIG. 1, which may be co-located with a routing device such as a router 39a on an end-to-end path via an ISP network 35 and/or another external network (i.e. a network external to the LAN or LANs in question) between two communicating end-points, the router itself being used to route packets between those end-points (and generally between other sources and destinations, not shown). The network equipment on which the method is implemented may be located elsewhere, but should generally be in communication with a device on the end-to-end path such as router 39a, as shown in FIG. 1. Generally, packets on the end-to-end path in question may pass via one or more other routers, such as router 39b, and via one or more other external networks such as the internet. Such end-to-end communications can take place between any of a number of devices in a local (e.g. home or office) network (such as a smart phone 11, a laptop computer 12, a wired computer 13, an Internet-connected "smart" fridge-freezer 14, for example) and a remote device outside the local network. Other devices (not illustrated) could be, for example, smart (i.e. Internet-connected or Internet-enabled) televisions, set-top-boxes, etc. All may be connected via a home gateway device 10 (which may connect to an access network, not shown separately, and via a core network, not shown separately) to the Internet and/or the ISP network 35. At the other end of the communication link there may be a content server 46 serving such things as web-pages or streaming video, or another user device such as another user's smartphone 21. That smartphone or another such user device may be linked to the Internet and/or the ISP network 35 via its own home-gateway 20. It should be noted that the content server 46 could be a caching server embedded in the Internet, the ISP network 35 or another ISP network (not shown). DPI device 38 (or a device providing packets or copies of packets to a DPI device) may be located anywhere on the end-to-end path, and may comprise as a processing module or be linked to a computer system having a central processor unit (CPU), a data store and an input/output (I/O) interface as shown in FIG. 6, for example.

The present method uses DPI to intercept packets (or receive thereof) and analyse each flow of data. Techniques for DPI have been used for more than ten years. First they were used to identify different types of traffic and to limit certain types of traffic such as peer-to-peer file-sharing. Later techniques added the ability to calculate the performance of flows of data by, for example, looking at the inter-arrival times of packets and determining the bandwidth used by each flow. Later techniques identify individual devices communicating across the Internet.

The present method goes further than the above, also classifying devices with reference to at least the following:
  (i) Their means of communicating within the home or premises (i.e. the type of network interface with which they are (or are likely to be) communicating within the home or premises); and
  (ii) Their portability.

Figure 2:
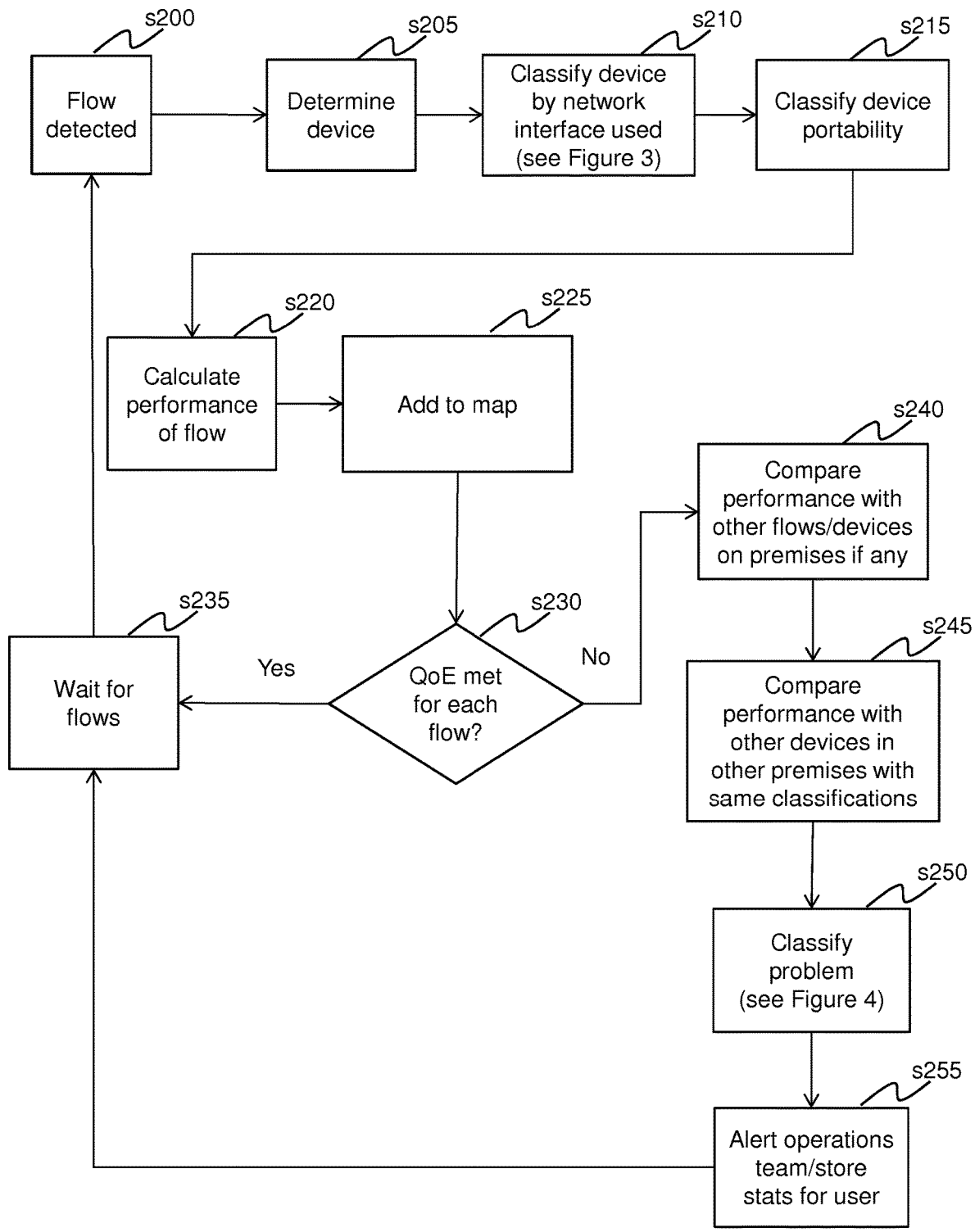
FIG. 2 is a flow-chart showing how network performance monitoring may be performed in order to obtain diagnostic test results according to a preferred embodiment.
Figure 5:
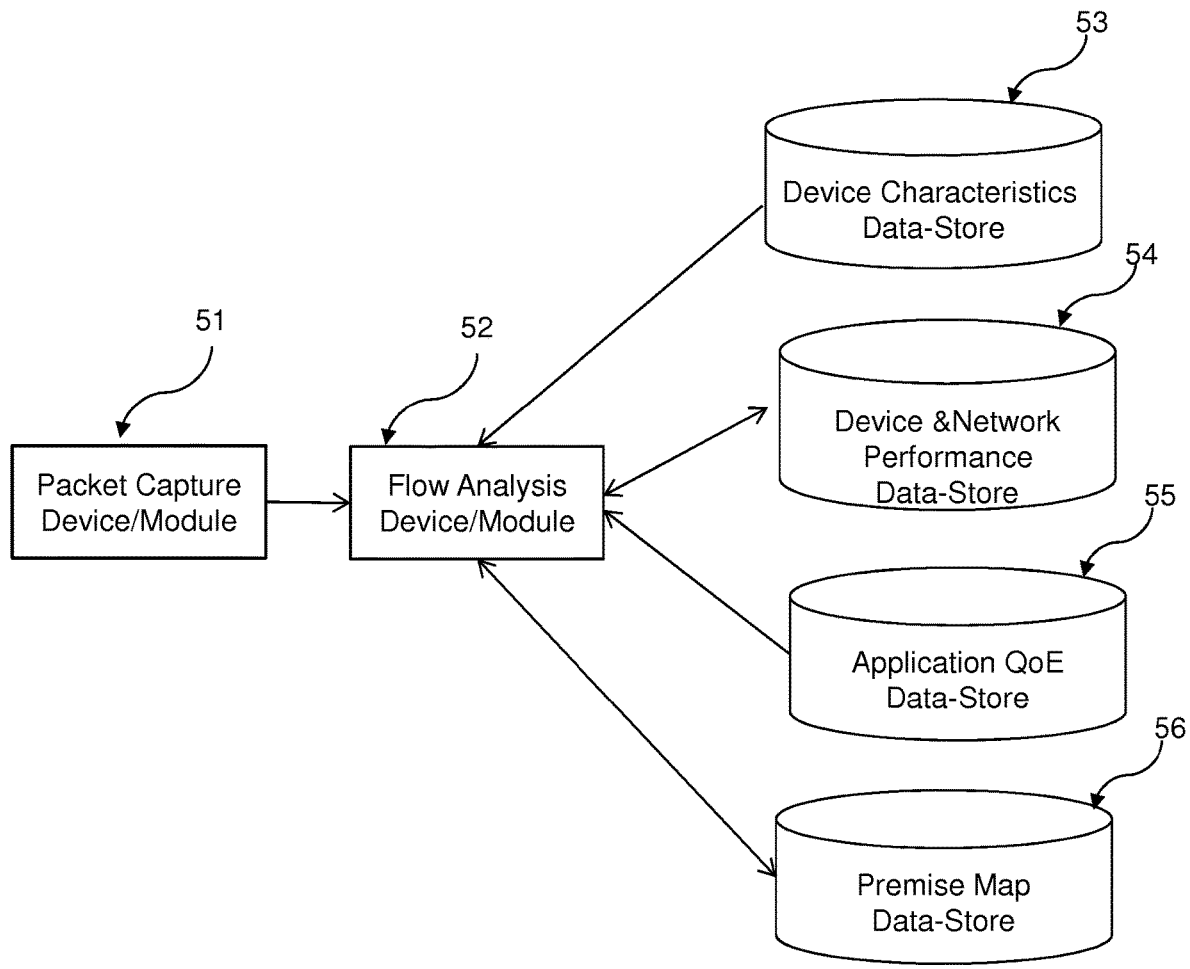
FIG. 5 illustrates various processing entities and data stores which may be involved in performing a method according to a preferred embodiment.

FIG. 2 details a preferred mechanism for performing such a method. FIG. 5 details various processing entities and data-stores which may be involved in performing such a method.

Referring first to FIG. 5, a packet capture device or module 51 (which may comprise router 39a having an associated DPI device 38 as shown in FIG. 1, or may be a single device on the path) sits on a network path and captures packets passing through, passing them (or copies thereof) to a flow analysis device or module 52 for analysis in order to detect individual flows of data. Step s200 of FIG. 2 represents the standard operating of any DPI device. A flow of packets is detected. By a flow we generally mean a sequence of packets from the same source to the same destination pertaining to the same network-based or network-reliant application. From the packets in the flow, the user-device and/or other devices involved in the communication is/are determined (step s205). This can be done, for example, by looking at the "User Agent" field of the HTTP header of one or more packets of the flow in question. This specifies such details as browser type, device type and screen size. The "User Agent" field is primarily intended to aid the communication with content servers, so that content tailored to a particular device can be provided, for example.

Alternative or additional information can be obtained from other sources such as the entity with which the user-device is communicating. This may be for example a content server, another user-device, an Internet of Things (IoT) platform (which may be applicable in the case of IoT sensors or other devices reporting back to manufacturer servers, for example.

After identifying the device, the next stage is to classify the device by the type of network interface used (step s210). A preferred process for performing this is shown in more detail in FIG. 3.

Figure 3:
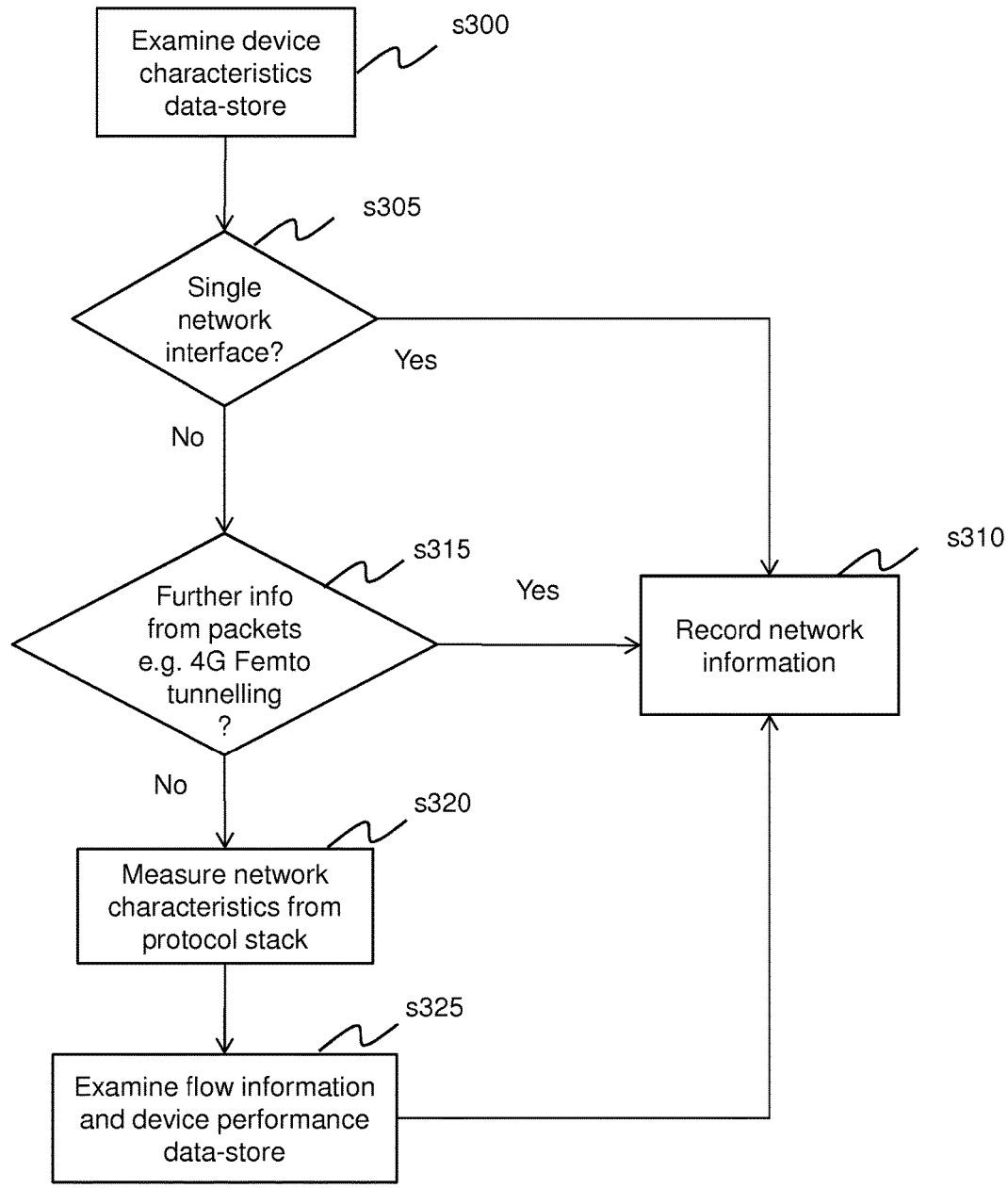
FIG. 3 is a flow-chart showing how the step in FIG. 2 of classifying devices by network interface used may be performed.

Referring to FIG. 3, the identified device is looked up (step s300) in a device characteristics data-store 53 (shown in FIG. 5) to determine what type or types of interface the device has. The data-store has an entry for each known device and a list of one or more interfaces that the device has. For example "YouView" set-top boxes currently have wired Ethernet interfaces only. "Now-TV" set-top boxes from Sky currently have WiFi interfaces only. Current Smartphones generally have both WiFi and 4G (or similar) interfaces. Smart TVs may have WiFi and/or wired Ethernet interfaces. Additionally some devices may have additional interfaces by virtue of using accessories, such as a WiFi interface by virtue of a USB accessory.

If a device is found at step s305 to have only one interface, the device can be classified based on that, and the network information can be stored (step s310) in a Device & Network Performance Data-Store 54 (shown in FIG. 5). If the device is found to have more than one interface then a further step may be performed of examining the packet data to determine which of those interfaces is being (or is likely to be being) used (step s315). An example here would be to look at the packet headers to see if the flow is part of femtocell traffic (e.g. if the packet contents are encrypted and have a known destination that is the end-point for a cellular network flow). At this stage the Time To Live (TTL) field of the packets can be examined, for example. If the TTL value of packets from different devices is different it would indicate that there is further routing equipment in the home/premises (each routing device decrements the TTL by one and the home-gateway will act as a router).

If the interface being used cannot be determined from packet headers, the flow as a whole may be examined (step s320) to determine its network characteristics. It can then be compared to the flow behaviour of other devices in the home with a known interface and/or to that of similar devices in other homes or premises (step s325). This may be done by examining the Device & Network Performance Data-Store 54. Generally, it is reasonable to expect there to be more consistency in the network characteristics for wired devices than for wireless devices over time, for example. It is expected that measurements from all wired devices would form a cluster, whereas those from wireless devices would deviate to a greater or lesser extent from this cluster. Once the interface has been identified or the probability that it is a certain interface is over a given threshold, that information can be stored (step s310) in the Device & Network Performance Data-Store 54.

Returning to FIG. 2, after identifying the type of network interface being used, the device is classified as to its portability (step s215). This information generally comes from the Device Characteristics Data-Store 43. Devices can be classified as follows, for example:
  "Mobile", "Portable", "Luggable" or "Static", where:
  Mobile devices are devices such as mobile/smart phones and tablets. They can be and are expected to be moved around the home or premises frequently.
  Portable devices are those that can be easily carried but tend to be used in only a few places at a time, such as laptop computers.

Luggable devices are devices such as televisions that are not normally moved frequently, but are still light enough to be moved occasionally. Step-changes in performance may be seen if a television (for example) is moved to a different location in a home.

Static devices are heavy (e.g. a fridge-freezer) or fixed (e.g. a central heating boiler) devices. While they can be moved (e.g. on installation), they rarely are, once they have been installed. In the case of a boiler move, it would be expected that a networked controller would change if a boiler was installed in a new location.

It will be understood that the portability level for a device is an indication of how portable the device (or a device of the category in question) is deemed to be. It is determined based on the device category obtained for the device, and may be expressed in numerical form, as a label, or otherwise. The portability level for a device having a particular device category would in general be based primarily on the size and/or weight of the device (or of devices of the category in question), but may also be based on factors such as the manner in which devices of that category are expected to be used, whether they are expected to be moved from location to location or not, whether they are generally physically fixed in one location or not, and other such factors. The portability levels for devices having particular device categories may be stored in the form of a look-up table or otherwise, and may be updated periodically to take account of new information about devices, information about new devices, etc. Taking account of the "portability" of the user-devices in question as well as the types of network interfaces being used by them allows any diagnoses made in respect of any local networks to be made while taking account of whether perceived performance level changes are likely to have been caused by factors such as movement of the device within the LAN rather than by actual changes in network performance either within or outside the LAN, all without requiring a monitoring device to be located within the LAN.

While four categories are referred to here, other categories or numbers of categories can be used.

Another device that can be considered static (even though it isn't generally large, heavy or fixed) is the home gateway itself. Many home gateways conduct line tests to determine network performance. This gives a base-line for the network performance in the home. Differences in network performance as seen by the home gateway and by devices at a similar time can be considered as due to the local home network.

Static devices that use WiFi can be used to provide a baseline WiFi performance signal. This is because changes in their performance are likely to be due to interference or congestion due to other WiFi activity in the home, rather than due to changes in their location. Luggable devices that use WiFi may be used for a similar reason as a fallback option (if there are no such static devices, for example).

In step s220 a measure of the Quality of Experience (QoE) of the flow is calculated. The application is determined and the network characteristics (for example delay, jitter, throughput, etc.) are measured, allowing a QoE score to be calculated according to a desired algorithm. The application and performance characteristics are compared against values in the Application QoE Data-Store 55 (shown in FIG. 5) to test whether expected QoE levels have been met. A home network map can be built up in terms of network performance over space and time (step s225) stored in the Premise Map Data-Store 56 (shown in FIG. 5). A flow can be compared with others in the same premises over time, or across different devices, or a flow from a device can be compared to a flow from a similar device using the same network type and having the same portability characteristic. Next, a check may be performed as to whether the expected QoE level or a QoE target has been met for each flow (s230). Note that some limit would generally be placed on which flows are tested e.g. they should generally be time-bounded. If a QoE threshold is met for all flows then the process waits for more flows (s235). With more than one flow in the map, performance of the current flow can be compared to other flows on the premises if there are any (s240).

As well as comparing the devices in the home/premises, devices can be compared across other homes/premises (step s245) to measure performance against the average performance for the same application or type of application, on the same or similar type of device, on the same type of wireless network technology. With the comparisons undertaken in steps s240 and s245 a classification of the reason for missing a QoE target can be carried out to classify the problem (s250).

A number of different ways of classifying poor QoE can be given as illustrations of the kind of data interpretation that can be performed in step s250. Where a single WiFi device is used in a home, its performance can be tracked over time. For example, poor QoE occurring for bursts of up to a few minutes could indicate interference from a microwave oven, whereas poor QoE at regular times could indicate some electronic device in the home with a regular clock causing interference.

Figure 4:
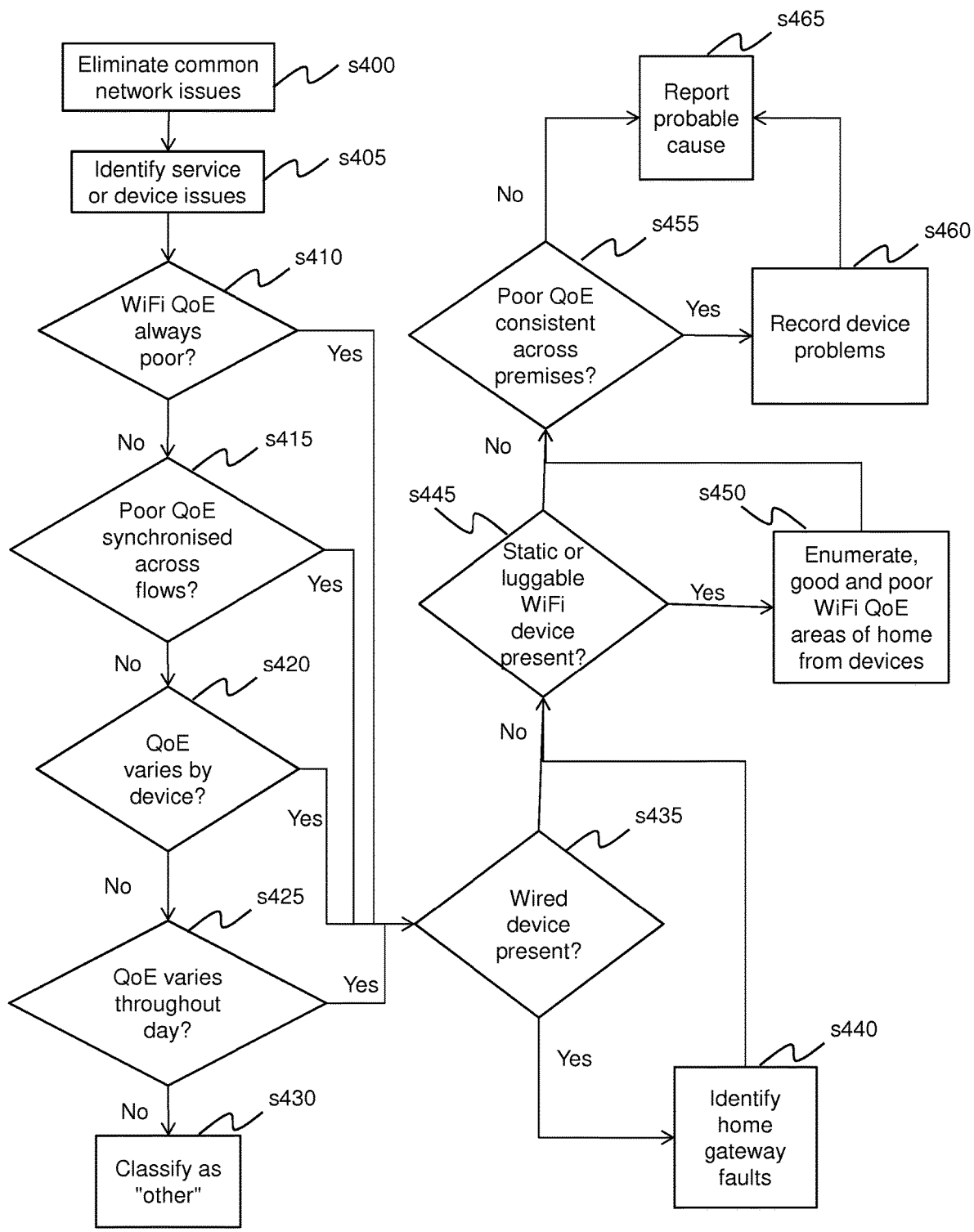
FIG. 4 is a flow-chart showing how the step in FIG. 2 of classifying problems may be performed.

FIG. 4 indicates in more detail a possible way of performing the "problem-classifying" step s250. It will be noted that there are many more permutations possible, however.

The first step (s400) is to eliminate network issues on common network elements (i.e. the ISP's network and the public Internet. The next step is to look at the results from other premises (s405) in order to identify if any problems are due to the service being used (e.g. if the same video streaming service was showing as having poor QoE across many premises) or if the same/similar devices were all showing poor QoE (which may be indicative of a faulty system update, for example).

The next set of steps (s410 to s425) are examples of conditions identified from looking at the QoE of all flows in a premises. Step s410 tests whether the WiFi QoE is consistently poor across all flows. This could be indicative of a problem with the home gateway, another such fault, or a source of interference near the home gateway, etc. Step s415 tests whether poor QoE is synchronized across flows, e.g. if it affects more than one flow at the same time. This could indicate transient interference such as that from a microwave oven. Step s420 tests if QoE varies by device e.g. if one device is consistently underperforming while others are not. If QoE can vary irregularly throughout the day (s425), this may suggest that there are particular cold-spots for WiFi in the premises and/or possible interference. Steps s410 to s425 encompass most common problems, but if none appear to be applicable, the problem may be identified as "other" at s430.

For the problems identified in s410 to s425, the next step may be to ascertain if wired devices are present (s435). The presence of wired devices can help determine if the home gateway is faulty (s440). Checking if any static or luggable WiFi devices are present (s445) allows enumeration of hot or cold WiFi spots in the premises (s450). Static or luggable WiFi devices that have consistently good QoE indicate that there is at least one part of a premises that has good WiFi coverage. Hence it is likely that it is the size of the premises or the construction (e.g. solid internal walls) that is causing poor WiFi QoE to other devices. Where static or luggable devices have poor WiFi QoE, and other devices sometimes have good QoE, this is indicative of at least one WiFi cold-spot in the premises. The performance of the flow may then be tested against that for similar devices using the same type of network with the same portability characteristic (s455). If QoE is consistently poor within other premises then this may be recorded (s460). The final step (s465) reports on the probable cause of problem based on information gathered in previous steps.

Returning to FIG. 2, with a probable cause reached, an operations teams (e.g. of the ISP) and/or the end-user are notified of any issues (step s255).

The process then reverts to waiting for more flows (step s235).

FIG. 6 is a block diagram of a computer system suitable for use in performing methods according to preferred embodiments. Such a system may be linked to a DPI device 38 such as that shown in FIG. 1 (or a device providing packets or copies of packets to such a DPI device). In such a computer system, a central processor unit (CPU) 602 is communicatively connected to a data store 604 and an input/output (I/O) interface 606 via a data bus 608. The data store 604 can be any read/write storage device or combination of devices such as a random access memory (RAM) or a non-volatile storage device, and can be used for storing executable and/or non-executable data. Examples of non-volatile storage devices include disk or tape storage devices. The I/O interface 606 is an interface to devices for the input or output of data, or for both input and output of data. Examples of I/O devices connectable to I/O interface 606 include a keyboard, a mouse, a display (such as a monitor) and a network connection.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the invention, which is defined by the appended claims, may include other novel features or combinations of features disclosed herein. The applicant hereby gives notice that new claims may be formulated to such features or combinations of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of obtaining diagnostic test results for one or more local area networks, each local area network having at least one user device located therein having at least one interface and being operable to communicate via said at least one interface and via a local area network gateway device with one or more remote devices in a communications network outside the local area network, the method comprising:

for each of a plurality of communication flows, each communication flow comprising a flow of data between a user device in a local area network and a remote device outside the local area network, inspecting data in said respective communication flow to obtain, at a monitoring device outside the local area network:
  a performance measure indicative of the performance of the communication flow between the user device and the remote device;
  a device category of the user device, said device category being selected from a plurality of predetermined device categories in dependence on data in said communication flow; and
  a network interface type indicative of the type of network interface being used by the user device for the communication flow, the network interface type being selected from a plurality of predetermined network interface types in dependence on data in said communication flow;

for each user device involved in one or more of said communication flows, determining a portability level of the user device, the portability level of the user device being one of a plurality of predetermined user device portability levels, the portability level of the user device being determined in dependence on the device category of the user device;

comparing the performance measures of said communication flows with a performance threshold to identify any communication flow whose performance measure is indicative of performance below a predetermined level, and in the event of any such communication flow being identified, obtaining a diagnosis of the local area network in which the user device is located in dependence on a comparison of the performance measure of said identified communication flow and one or more performance measures of other communication flows, the diagnosis being obtained in dependence on the respective portability levels and network interface types determined for the user devices involved in said communication flows.

2. A method according to claim 1 wherein the plurality of communication flows comprises flows of data between one or more user devices in the same local area network and one or more remote devices outside said local area network.

3. A method according to claim 1 wherein the plurality of communication flows comprises flows of data between respective user devices in different local area networks and one or more remote devices outside the local area network of the respective user device.

4. A method according to claim 1 wherein the inspection of data in said communication flows comprises deep packet inspection.

5. A method according to claim 1 wherein the performance measure indicative of the performance of the communication flow comprises measures of one or more of bandwidth, loss, latency and jitter.

6. A method according to claim 1 wherein the device category of the user device used for a communication flow is determined from information in one or more packet headers of one or more packets of which the communication flow is comprised.

7. A method according to claim 1 wherein the network interface type used for the communication flow is determined in dependence on the device category of the user device used in the communication flow.

8. A method according to claim 1 wherein the network interface type used for the communication flow is determined from analysis of the communication flow.

9. A method according to claim 1 wherein the network interface type used for the communication flow is determined from information in one or more packet headers of one or more packets of which the communication flow is comprised.

10. A method according to claim 1 wherein the diagnosis of a local area network in which is located a user device involved in a communication flow whose performance measure is indicative of performance below a predetermined level is obtained in dependence on the performance measure of said communication flow and one or more performance measures of one or more other communication flows involving one or more other user devices in the same local area network.

11. A method according to claim 1 wherein the diagnosis of a local area network in which is located a user device involved in a communication flow whose performance measure is indicative of performance below a predetermined level is obtained in dependence on the performance measure of said communication flow and one or more performance measures of one or more other communication flows involving one or more other user devices in one or more other local area networks.

12. A method according to claim 1 wherein the diagnosis of a local area network in which is located a user device involved in a communication flow whose performance measure is indicative of performance below a predetermined level is obtained in dependence on the performance measure of said communication flow and one or more performance measures of one or more other communication flows involving one or more other user devices having corresponding portability levels and/or network interface types.

13. A method according to claim 1 wherein the diagnosis of a local area network in which is located a user device involved in a communication flow whose performance measure is indicative of performance below a predetermined level is obtained in dependence on the performance measure of said communication flow and one or more performance measures of one or more other communication flows involving one or more other user devices having different portability levels and/or network interface types.

14. Apparatus for obtaining diagnostic test results for one or more local area networks, each local area network having at least one user device located therein having at least one interface and being operable to communicate via said at least one interface and via a local area network gateway device with one or more remote devices in a communications network outside the local area network, the apparatus comprising:
- one or more processors configured to inspect data in each of a plurality of communication flows, each communication flow comprising a flow of data between a user device in a local area network and a remote device outside the local area network to obtain, at a monitoring device outside the local area network:
    - a performance measure indicative of the performance of the communication flow between the user device and the remote device;
    - a device category of the user device, said device category being selected from a plurality of predetermined device categories in dependence on data in said communication flow; and
    - a network interface type indicative of the type of network interface being used by the user device for the communication flow, the network interface type being selected from a plurality of predetermined network interface types in dependence on data in said communication flow;
- the one or more processors further being configured to determine, for each user device involved in one or more of said communication flows, a portability level of the user device, the portability level of the user device being one of a plurality of predetermined user device portability levels, the portability level of the user device being determined in dependence on the device category of the user device;
- the one or more processors further being configured to compare the performance measures of said communication flows with a performance threshold to identify any communication flow whose performance measure is indicative of performance below a predetermined level, and in the event of any such communication flow being identified, to obtain a diagnosis of the local area network in which the user device is located in dependence on a comparison of the performance measure of said identified communication flow and one or more performance measures of other communication flows, the diagnosis being obtained in dependence on the respective portability levels and network interface types determined for the user devices involved in said communication flows.

15. A non-transitory computer readable medium storing computer program code to, when loaded into a computer system and executed thereon, cause the computer to perform the steps of the method as claimed in claim 1.

16. The apparatus according to claim 14 wherein the performance measure indicative of the performance of the communication flow comprises measures of one or more of bandwidth, loss, latency and jitter.

17. The apparatus according to claim 14 wherein the device category of the user device used in the communication flow is determined from information in one or more packet headers of one or more packets of which the communication flow is comprised.

18. The apparatus according to claim 14 wherein the network interface type of the communication flow is determined in dependence on the device category of the user device used in the communication flow.

19. The apparatus according to claim 14 wherein the network interface type used for the communication flow is determined from information in one or more packet headers of one or more packets of which the communication flow is comprised.

20. The apparatus according to claim 14 wherein the network interface type used for the communication flow is determined in dependence on the device category of the user device used in the communication flow.

\* \* \* \* \*